United States Patent

Coveney et al.

[15] 3,650,036
[45] Mar. 21, 1972

[54] APPARATUS FOR DETECTING SURFACE VARIATIONS

[72] Inventors: Donald B. Coveney, Ottawa, Ontario; Ronald J. Ouellette, Gatineau, Quebec, both of Canada

[73] Assignee: Canadian International Paper Company, Montreal, Quebec, Canada

[22] Filed: Nov. 6, 1969

[21] Appl. No.: 874,647

[30] Foreign Application Priority Data

July 11, 1969 Canada ..................................056778

[52] U.S. Cl. ..........................33/174 P, 33/174 PA, 33/174 L
[51] Int. Cl. ......................G01b 5/20, G01b 7/24, G01b 7/28
[58] Field of Search ..........33/174 P, 174 PA, 174 PB, 172 F, 33/172 R, 172 B; 162/262, 263

[56] References Cited

UNITED STATES PATENTS

| | | | |
|---|---|---|---|
| 1,078,861 | 11/1913 | Koch | 33/172 B |
| 1,208,765 | 12/1916 | Balderston | 33/172 B |
| 3,427,723 | 2/1969 | Leckey | 33/174 P |
| 3,440,738 | 4/1969 | Mangan | 33/174 P |
| 3,531,868 | 10/1970 | Stevenson | 33/174 P |

FOREIGN PATENTS OR APPLICATIONS

| | | | |
|---|---|---|---|
| 392,104 | 1965 | Switzerland | 33/174 P |

*Primary Examiner*—Leonard Forman
*Assistant Examiner*—Paul G. Foldes
*Attorney*—Robert Graham McClenahan and Eli J. McKhool

[57] ABSTRACT

An apparatus for detecting surface variations in large paper rolls in which a sensing mechanism is suspended from an overhead beam and is vertically and angularly movable into engagement with the roll surface, where it is held in place by gravity. The sensing mechanism includes an elongated reference arm and a sensing arm pivotally connected to the reference arm. A spherical contact element on the sensing arm rests on the roll such that there is only a single point of contact between the sensing mechanism and the roll. Upon horizontal movement of the sensing mechanism in a direction parallel to the axis of the roll, the sensing arm pivots relative to the reference arm in response to depressions or bulges in the roll surface. This pivotal movement is detected by a transducer which controls a recorder to provide a continuous visual indication of the surface contour of the roll.

21 Claims, 28 Drawing Figures

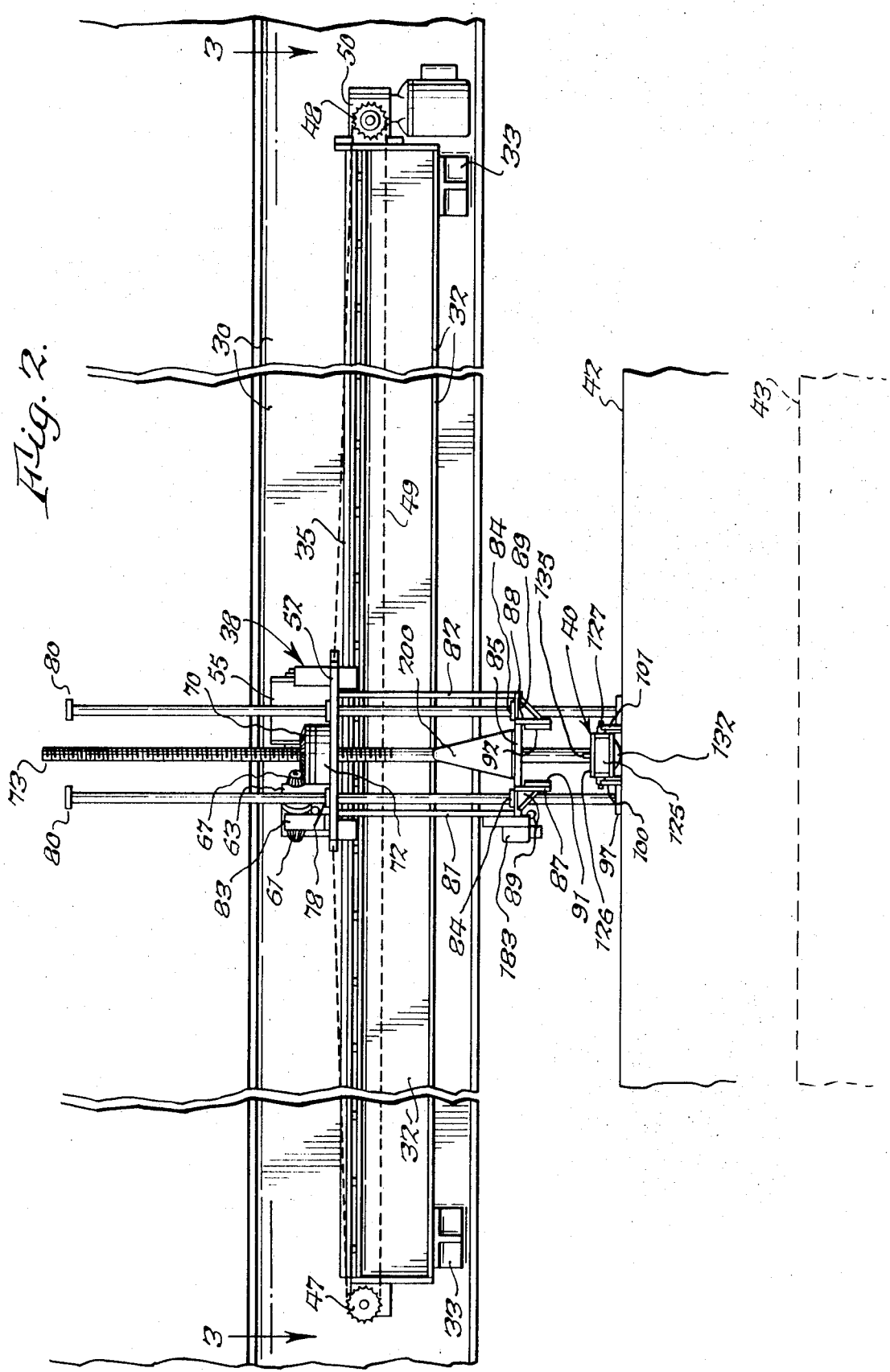

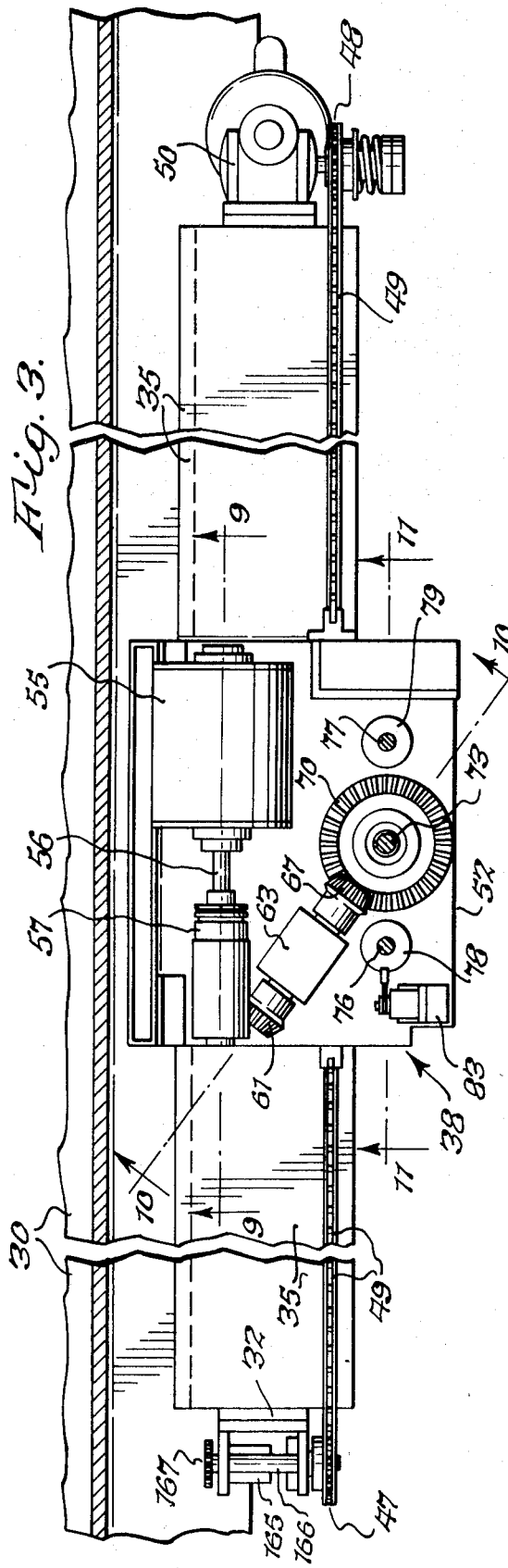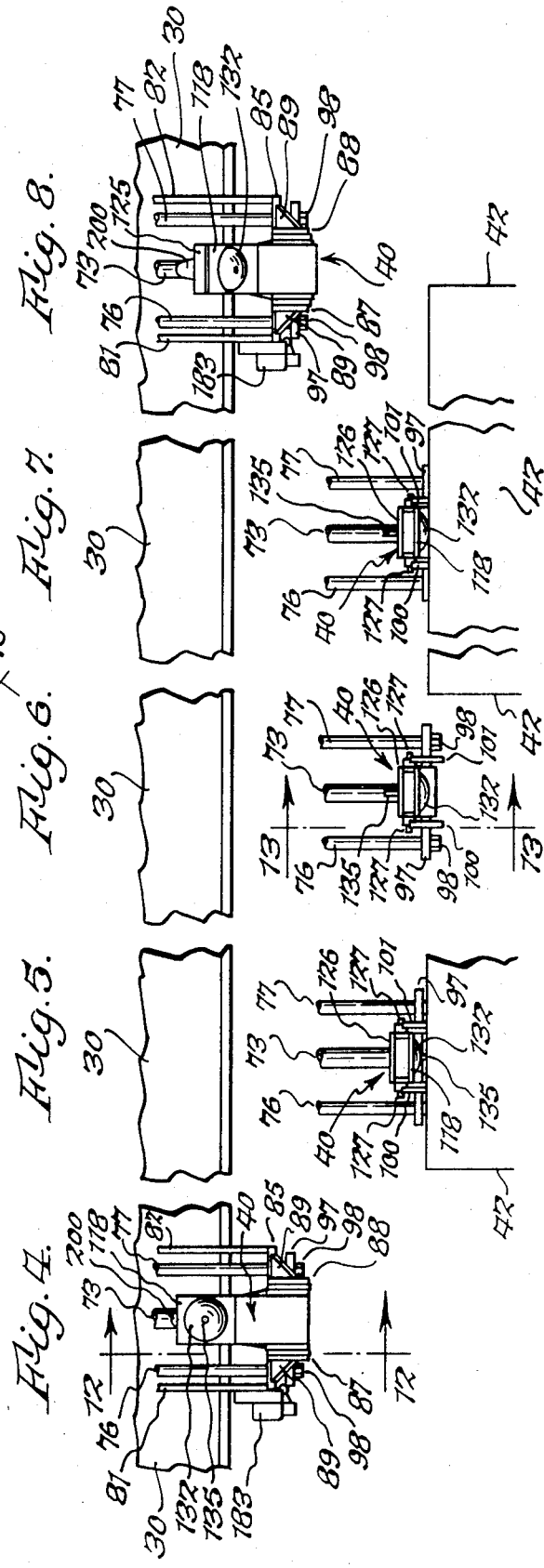

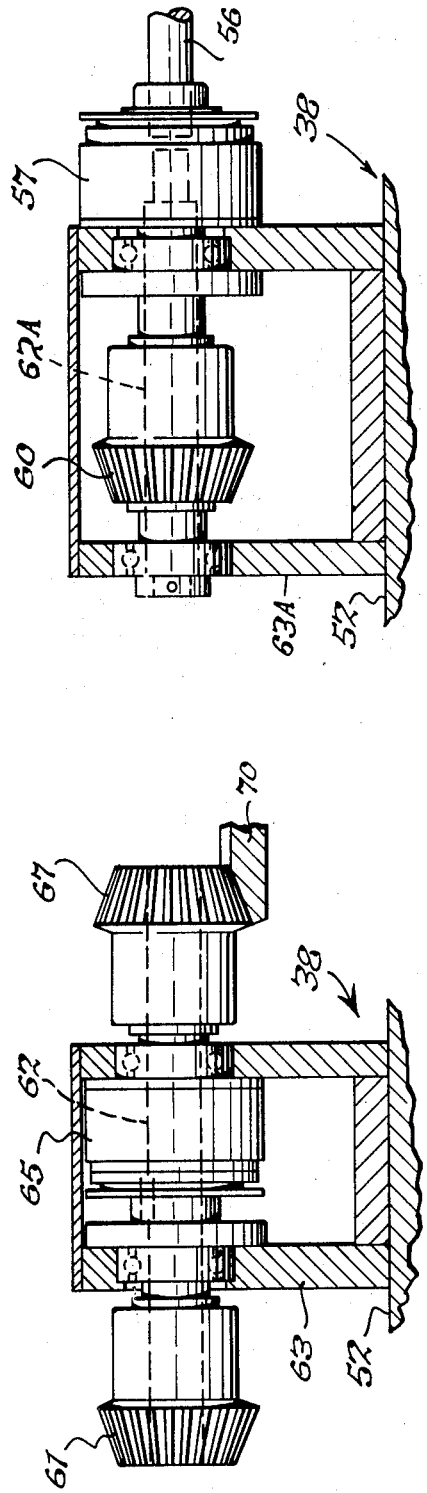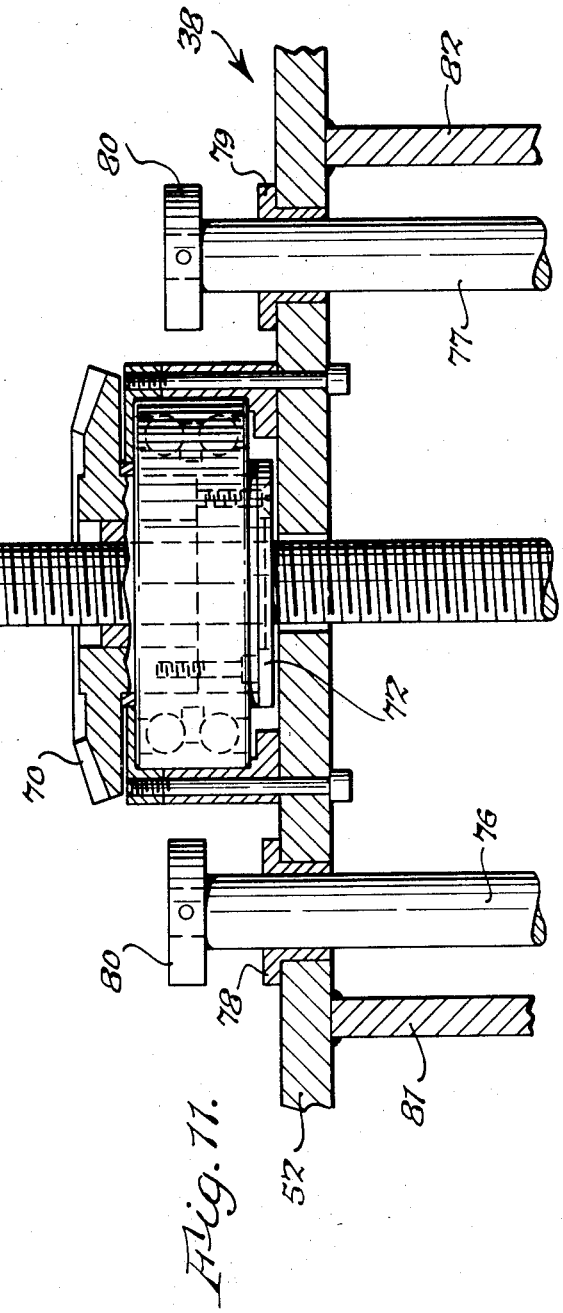

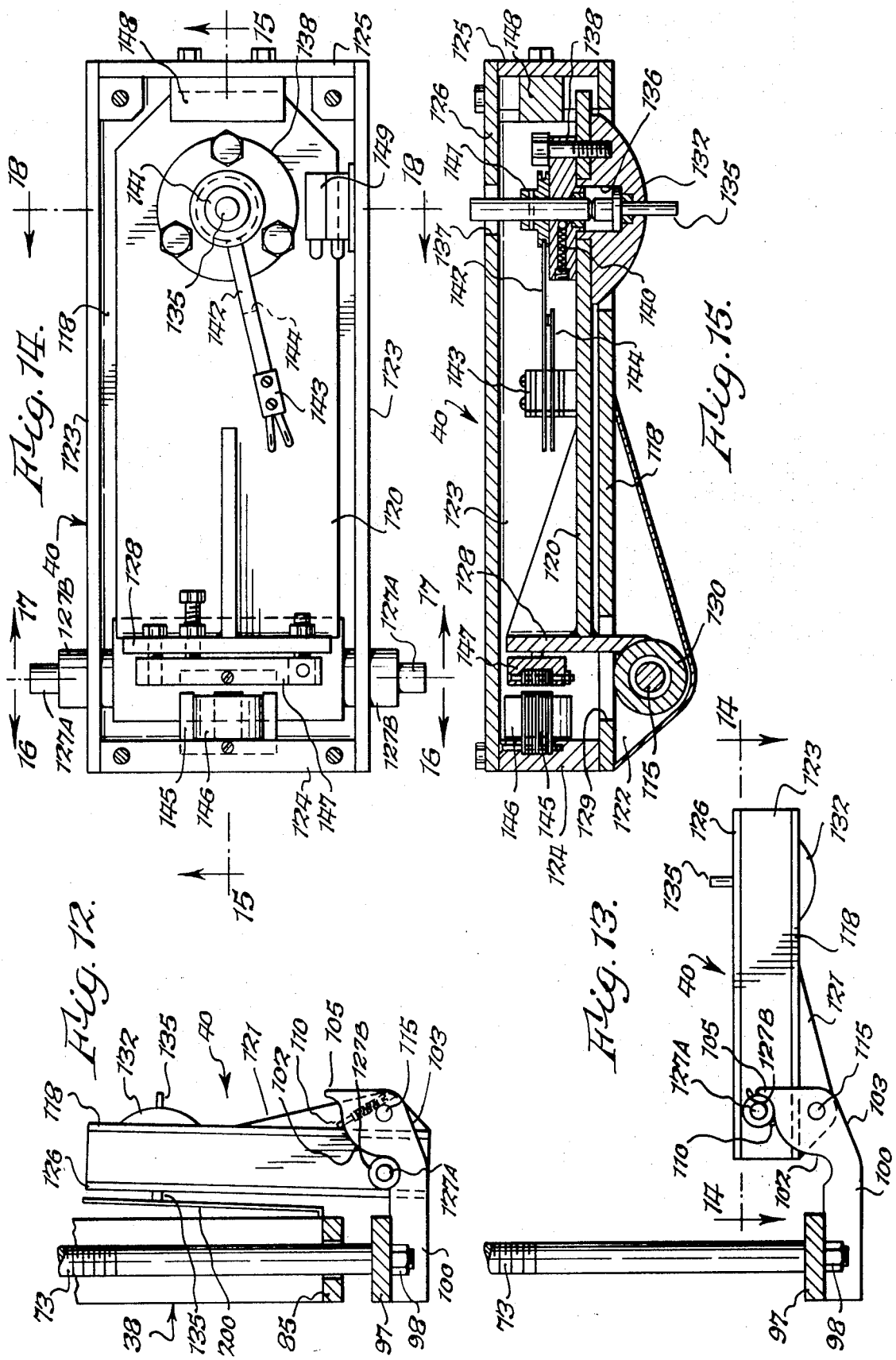

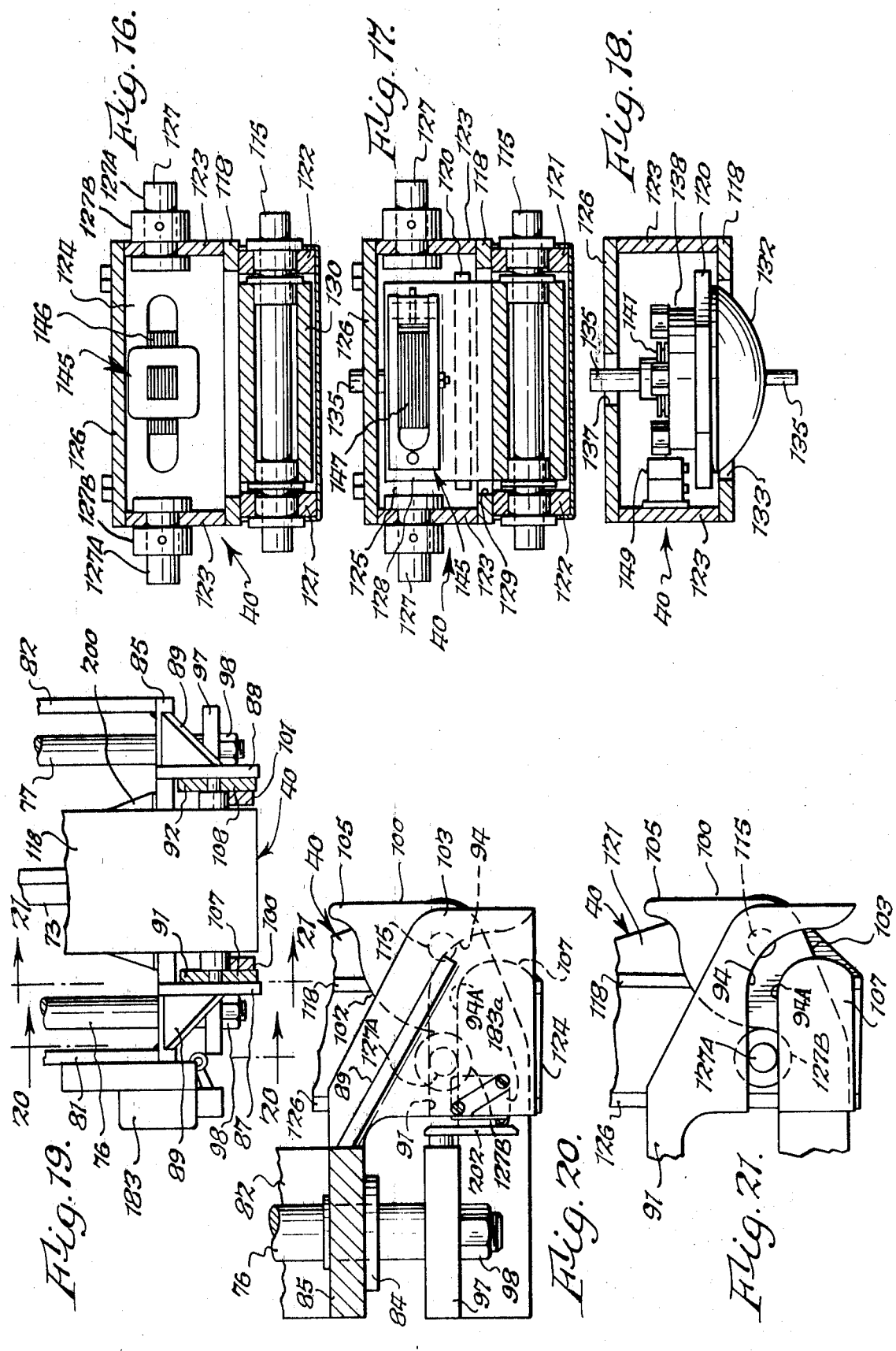

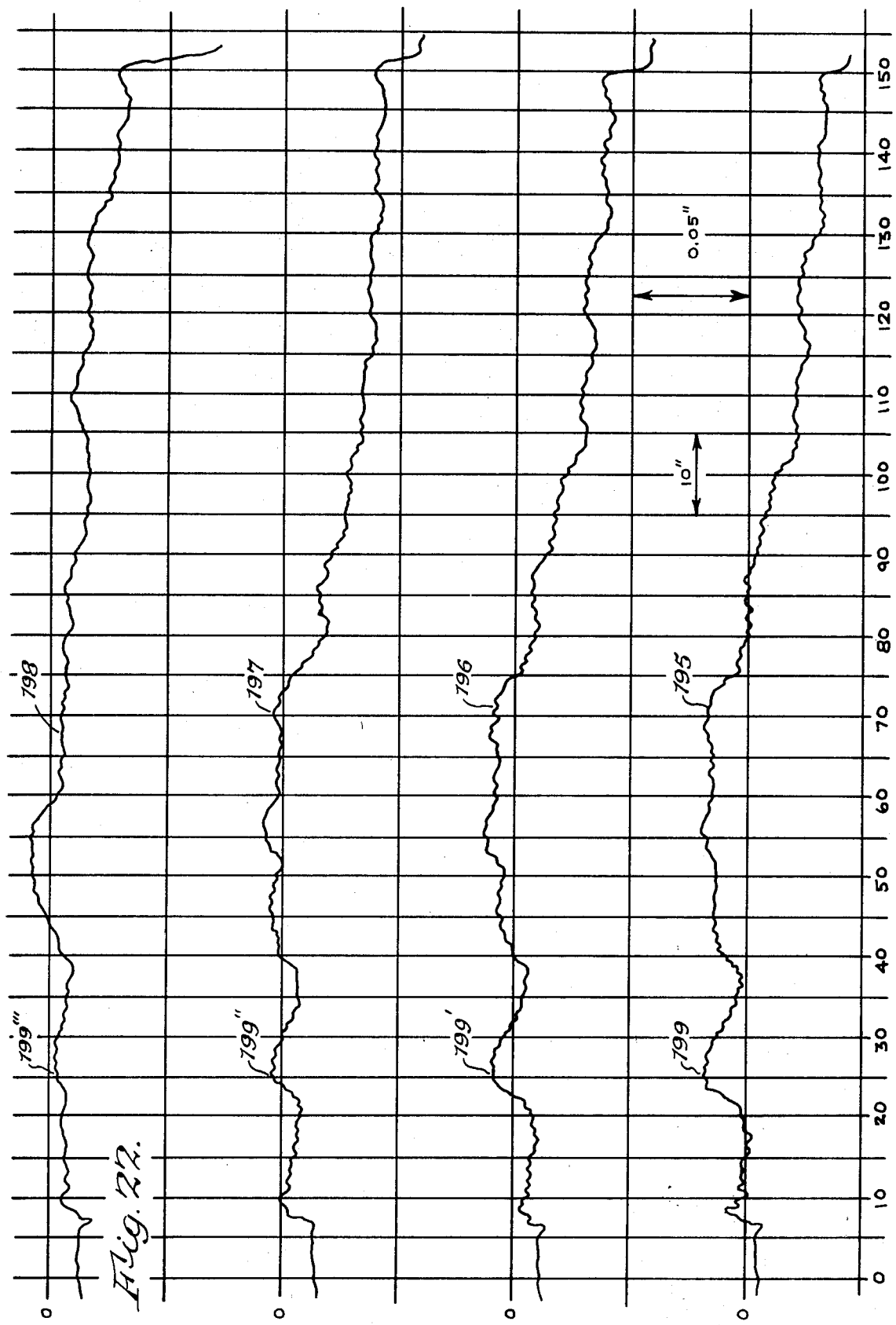

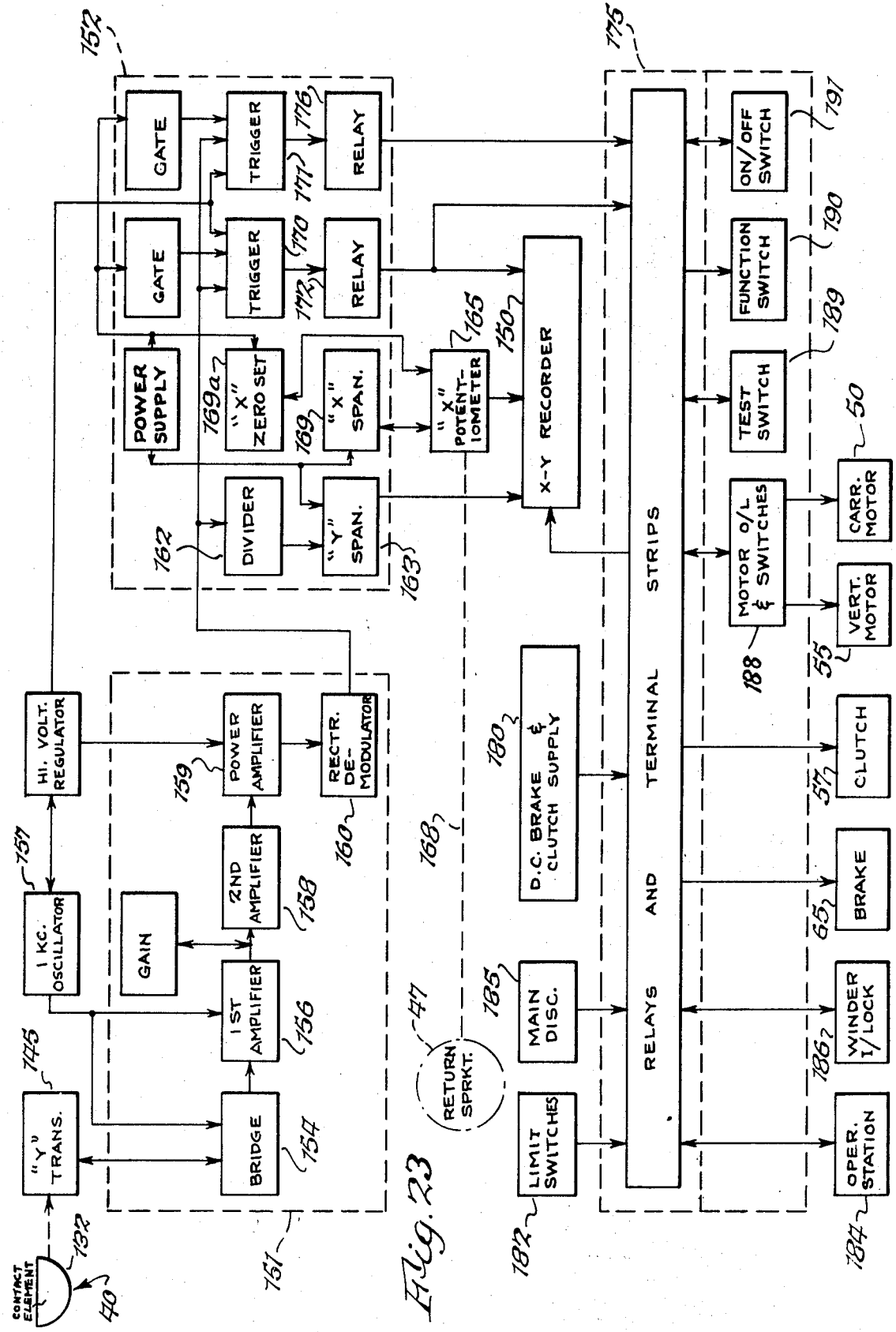

3,650,036

APPARATUS FOR DETECTING SURFACE VARIATIONS

BACKGROUND OF THE INVENTION

This invention relates to detecting apparatus and more particularly to apparatus for detecting surface variations in a roll of flexible sheet material.

The present invention, while of general application, is particularly well suited for detecting surface variations in a roll of paper or other fibrous material at the outfeed end of a papermaking machine. As is well known, such machines customarily include a forming section which receives a supply of water-saturated pulp and converts the pulp into a wet paper web, a press section in which the moisture content of the web is reduced and its fiber structure compacted, and a dryer section having a series of rotating drums which apply heat to the web to remove the remaining moisture. The thus manufactured paper is discharged from the machine in sheet form and is wound onto cores to form large diameter rolls which are prepared for shipment to the customer.

The surface condition of the rolls produced by the paper machine is of paramount importance. If a given roll exhibits high caliper areas or humps, for example, slack or baggy spots appear as the roll is unwound, and when the paper is cut into sheets such defects as chain wrinkles, uneven skids, etc., occur which seriously impair the quality of the product. Similarly, at places where depressions or hollows exist in the surface of the roll, the roll is often soft ad wrinkled. The various defects indicated by variations the gear the contour of the roll frequently result in breaking or wrinkling of the paper web as it is unwound, resulting in production problems for the customer. It occasionally becomes necessary to discard entire rolls.

In most papermaking operations, the foregoing difficulties may be reduced by making appropriate adjustments in the machine parameters. An uneven diameter with excessive hills and valleys along the roll may indicate a varying moisture content or uneven tension in the web, and a knowledge of the existence and extent of these defects enables the papermaker to reject the defective roll and to make corrective adjustments in the manufacture of succeeding rolls.

Heretofore, attempts to detect variations in caliper of a wound roll have not been entirely satisfactory. An an illustration, apparatus previously employed for this purpose commonly utilized a pair of opposed contact elements which were affirmatively held in engagement with the surface of the roll. Such devices frequently were not capable of measuring the critical edge portions of the roll. In addition, and this has been of special moment in the detection of surface variations in large rolls of paper, problems were encountered in the provision of detecting apparatus that was readily movable to a remote location when the apparatus was not in use. Furthermore, the prior detecting apparatus often proved deficient in the measurement of successive rolls having widely varying diameters and in the rapid and accurate transmission of the detected information to the operators of the paper machine.

One general object of this invention, therefore, is to provide new and improved apparatus for detecting surface variations in a roll of flexible sheet material.

More specifically, it is an object of this invention to provide such apparatus having a contact element which is maintained in continuous engagement with the surface of the roll and produces an accurate profile of the surface contour.

Another object of the invention is to provide apparatus of the character indicated in which the sensing mechanism of the apparatus is readily movable to a remote position when not in use.

A further object of the invention is to provide apparatus for measuring surface variations in rolls of widely varying diameter and width.

Still another object of the invention is to provide new and improved detecting apparatus which is economical to manufacture and thoroughly reliable in operation.

SUMMARY OF THE INVENTION

In accordance with an illustrative embodiment of the invention, the apparatus comprises a carriage assembly which is slidably mounted on an overhead frame for translatory movement in a direction parallel to the axis of the roll. The carriage assembly supports a sensing mechanism which includes a reference arm arranged to traverse an accurate straight line reference path parallel to the paper roll axis and a sensing arm arranged to ride along the top center surface of the roll during the movement of the carriage assembly. As the sensing arm moves along the roll, it pivots relative to the reference arm in response to humps or depressions on the surface. The relative movement between the arms is detected by a transducer which cooperates with a recorder or other indicating mechanism to provide a continuous visual indication of the surface of the roll.

In accordance with one feature of the invention, in certain particularly advantageous arrangements, there is provided only a single roll contacting element which is mounted on the sensing arm and is held by gravity in engagement with the cylindrical surface of the roll. With this arrangement, the construction and operation of the apparatus are simplified in many respects, and the surface variations detected by the transducer are unaffected by any unnecessary pressure against the roll as a result of such factors as the use of a plurality of sensing elements, mechanical or pneumatic pressure applying devices, etc.

In accordance with another feature of several advantageous embodiments of the invention, the sensing mechanism is connected to the carriage assembly by an arrangement which permits both vertical translatory movement and angular movement of the sensing mechanism with respect to the assembly. The sensing mechanism is movable between a remote retracted position above and beyond the roll and an operative position in which the sensing arm extends in a substantially horizontal direction with the contact element in contact with the roll. As a result, with the sensing mechanism in its retracted position even large diameter rolls may be readily removed from the measuring location without adversely affecting the detecting apparatus.

In accordance with a further feature of the invention, in certain good arrangements, the contact element is provided with a reciprocably mounted feeler protruding therefrom. During movement of the sensing mechanism toward the roll, the feeler contacts the roll prior to the contact element and actuates a brake which retards the further movement of the sensing mechanism.

In accordance with still another feature of the invention, in some embodiments, there is provided a novel control circuit for the apparatus which is effective to automatically operate each of the various electrical components in predetermined sequence.

The present invention, as well as further objects and features thereof, will become more fully apparent from the ensuing detailed description of a preferred embodiment, when read with reference to the accompanying drawings.

BRIEF DESCRIPTION OF THE DRAWINGS

FIG. 2 is a front view of the apparatus as seen from the line 2—2 in FIG. 1, with portions shown broken away;

FIG. 3 is a plan view of the apparatus as seen from the line 3—3 in FIG. 2, with portions shown broken away and in section;

FIGS. 4–8 are partially schematic front views showing different sequential positions of the apparatus as it moves toward and away from the roll;

FIG. 9 is an enlarged detail sectional view taken along the line 9—9 of FIG. 3;

FIG. 10 is an enlarged detail sectional view taken along the line 10—10 in FIG. 3;

FIG. 11 is an enlarged detail sectional view taken along the line 11—11 in FIG. 3;

FIG. 12 is an enlarged fragmentary sectional view taken along the line 12—12 in FIG. 4 of the sensing mechanism of the apparatus, together with certain associated parts;

FIG. 13 is an enlarged fragmentary sectional view similar to FIG. 12 but with the sensing mechanism in a different position;

FIG. 14 is an enlarged plan view of the sensing mechanism as seen from the line 14—14 in FIG. 13;

FIG. 15 is a vertical sectional view taken along the line 15—15 in FIG. 14;

FIGS. 16, 17 and 18 are detail sectional views respectively taken along the lines 16—16, 17—17 and 18-18 in FIG. 14;

FIG. 19 is a fragmentary front view of a portion of the apparatus, with certain parts shown in section;

FIG. 20 is a sectional view taken along the line 20—20 in FIG. 19;

FIG. 21 is a fragmentary sectional view taken along the line 21—21 in FIG. 19;

FIG. 22 is a graph showing the surface contour of successive rolls of paper as detected by the apparatus;

FIG. 23 is a schematic block diagram of an electrical circuit for the apparatus.

DESCRIPTION OF A PREFERRED EMBODIMENT

Figure 1:
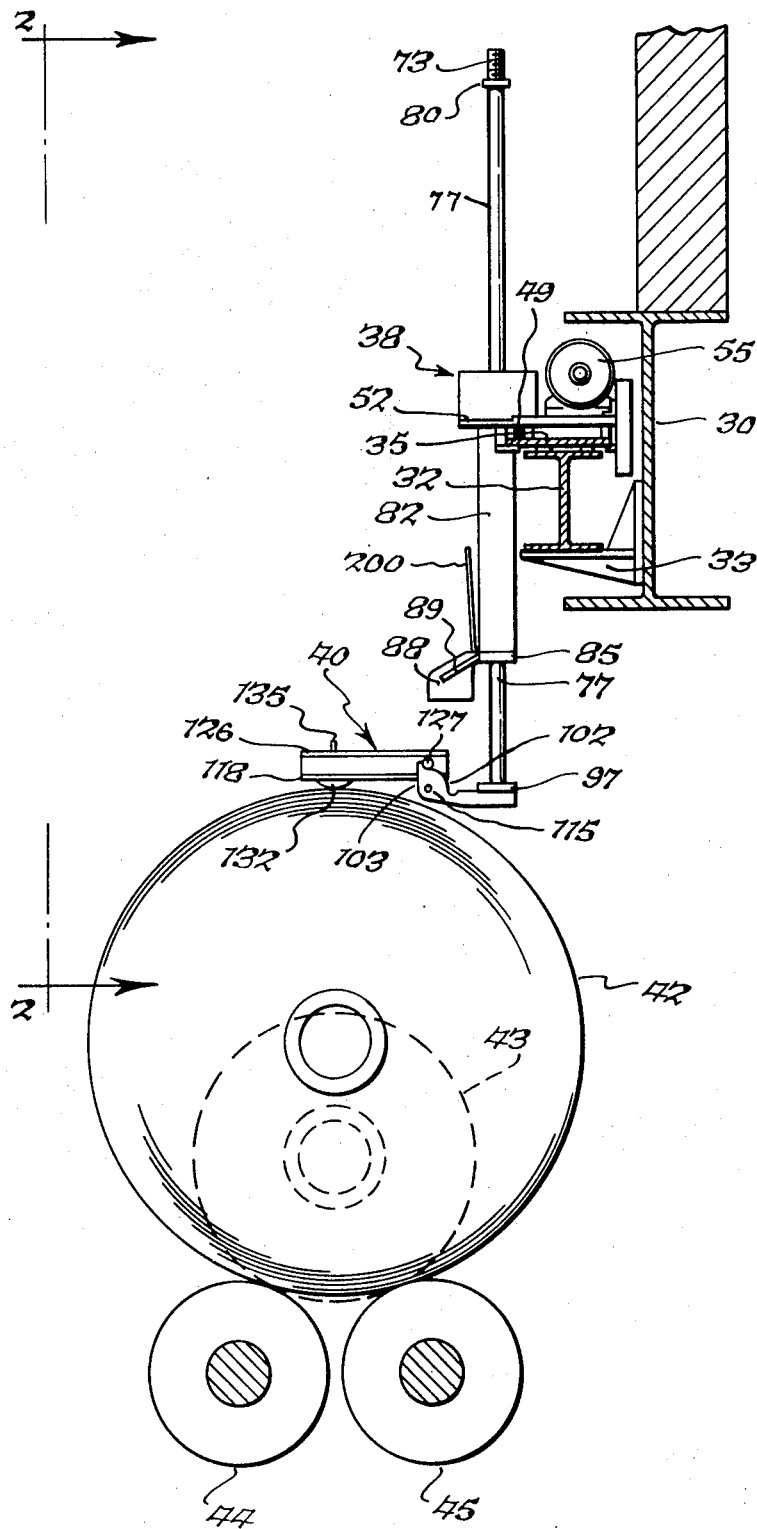
FIG. 1 is a vertical elevational view, with certain portions shown in section, of apparatus for detecting surface variations in a roll of flexible sheet material in accordance with one illustrative embodiment of the invention.

Referring to FIGS. 1-3 of the drawings, there is shown a detecting apparatus which is suspended from an overhead structural beam 30. The apparatus comprises a horizontally extending frame including a second beam 32 connected to one side of the beam 30 by brackets 33. A slide 35 is rigidly but adjustably mounted on the upper surface of the beam 32 in spaced relationship therewith, and this slide accommodates a carriage assembly indicated generally at 38. The lower end of the carriage assembly 38 is provided with a sensing mechanism 40 which is disposed above a stationary roll 42 of paper or other flexible sheet material. In the embodiment shown in the drawings, the roll 42 illustratively is 42 inches in diameter. However, the apparatus is equally well suited for use with rolls having diameters that vary widely from the roll 42, such as the 24 inch roll indicated schematically at 43, for example. The roll is supported by the usual winding rolls 44 and 45 at the outfeed end of a papermaking machine (not shown).

The carriage assembly 38 is supported for horizontal translatory movement along the slide 35 in a direction parallel to the axis of the paper roll 42. As best shown in FIGS. 2 and 3, two sprockets 47 and 48 are respectively mounted adjacent opposite ends of the beam 32, and these sprockets are provided with a drive chain 49 affixed to the carriage 38. The sprocket 48 is driven by an electric motor 50 to urge the carriage 38 along the slide 35 at a constant speed.

The carriage assembly 38 comprises a substantially flat horizontal plate 52 which supports a two-speed vertical drive motor 55. The motor 55 includes an output shaft 56 (FIGS. 3 and 9) which is connected through an electromagnetic clutch mechanism 57 to a jack shaft 62A. The shaft 62A is rotatably carried above the carriage plate 52 by a housing 63A. A bevel pinion 60 is mounted on the jack shaft 62A within the housing 63A and is in meshing engagement with a second bevel pinion 61. As best shown in FIG. 10, the bevel pinion 61 is mounted on one end of a jack shaft 62 which is rotatably carried above the carriage plate 52 by a housing 63. An electromagnetic brake 65 is disposed within the housing 63 around the shaft 62, and the shaft protrudes from the housing and is provided with a third bevel pinion 67 at its opposite end.

The jack shaft 62 extends at about a 37° angle with respect to the motor shaft 56, and the bevel pinion 67 on the shaft meshes with a bevel gear 70. As best shown in FIG. 11, the gear 70 is supported for rotation about a vertical axis and is maintained in fixed relationship with an internally threaded drive assembly 72 between the gear and the plate 52. The drive assembly 72 accommodates a threaded post 73 having an upper end which is disposed above the 70. The post 73 extends downwardly 70 from the gear 70 and is affixed at its lower end to the sensing mechanism 40.

Also extending in a downward direction on opposite sides of the threaded post 73 are two slide rods 76 and 77. The rods 76 and 77 are mounted in suitable bearings 78 and 79 in the carriage plate 52 and are provided with stop collars 80 at their upper ends. The lower portions of the post 73 and the rods 76 and 77 are partially enclosed by two parallel housing plates 81 and 82 (FIGS. 11 and 19) which are welded or otherwise affixed to the lower surface of the plate 52. A limit switch 83 (FIGS. 2 and 3) is supported on the upper surface of the plate 52 in position to be actuated by the stop collar 80 on the rod 76 when the collar is immediately above the plate.

As best shown in FIGS. 2 and 20, the rods 76 and 77 protrude through bearings 84 in an upper yoke 85 beneath the carriage plate 52. The yoke 85 comprises a horizontal plate which extends between the lower ends of the housing plates 81 and 82 and is rigidly affixed thereto. The post 73 also protrudes through a clearance hole in the yoke 85 at the approximate midpoint of the yoke.

Extending in a lateral direction from and rigidly connected to the upper yoke 85 are two plates 87 and 88 (FIG. 19). The plates 87 and 88 are disposed in spaced-apart relationship with each other by stiffening gussets 89. Two pairs of camming members 91 and 107, and 92 and 108 are respectively affixed to the inner faces of the plates 87 and 88. As best shown in FIG. 21 with respect to the camming members 91 and 107, each pair of camming members includes an upper cam lower surface 94 and a lower cam upper surface 94A which extend in a horizontal direction from the yoke 85 and then curve downwardly.

The lower ends of the center post 73 and the rods 76 and 77 are rigidly connected to a lower yoke 97 by nuts 98. The yoke 97 comprises a horizontal plate which is disposed beneath the yoke 85 in substantially parallel relationship therewith. Two laterally extending brackets 100 and 101 (FIGS. 1 and 12) are supported in spaced relationship with each other on the yoke 97, and the upper surfaces of these brackets are each provided with a track 102. The track 102 on each bracket curves upwardly and outwardly adjacent the enlarged outer portion 103 of the bracket, and the bracket is provided with an upstanding finger 105 at its outer end which serves as a stop. The tracks 102 on the brackets 100 and 101 carry spring loaded pins 110 (FIG. 12) in spaced relationship with the upstanding fingers 105, for purposes that will become more fully apparent hereinafter.

The sensing mechanism 40 is pivotally supported between the cam brackets 100 and 101 by a pin 115. This pin extends through mating apertures in the enlarged outer portions 103 of the brackets 100 and 101 a short distance beneath the upstanding fingers 105. As best shown in FIGS. 14-18, mechanism 40 comprises an elongated reference arm 118 and a sensing arm 120 which are each pivotally connected adjacent one end to the brackets 100 and 101 by the pin 115. Thus, the reference arm 118 includes two depending flanges 121 and 122 through which the pin 115 extends. The sensing arm 120, said actuator 141, arms 142 and 144 and switch 143 constituting a transducer means for transducing the movement of detector pin 135 to electrical energy for controlling the speed of the vertical drive motor 55 is disposed above the reference arm 118 and is welded or otherwise secured to a pivot plate 128 at its inner end. The plate 128 extends downwardly from the sensing arm 120 through an opening 129 in the adjacent portion of the reference arm 118 and is affixed to a sleeve 130 surrounding the pin 115.

The inner end of the reference arm 118 is provided with an upstanding mounting plate 124, and the opposite end of the reference arm similarly is provided with an upstanding mounting plate 125. The plates 124 and 125 are connected by a cover plate 126 and side plates 123 to form a substantially enclosed housing for the sensing arm 120. Protruding outwardly from each of the side plates 123 is a comparatively short swing pin 127. The pins 127 are in coaxial alignment and rest on the surfaces 102 of the brackets 100 and 101. With this arrangement, the sensing mechanism 40 is angularly movable between a substantially vertical position (the position shown in FIG. 12) and a horizontal (FIG. 13) position.

Supported adjacent the outer end of the sensing arm 120 is a contact element 132 (commonly referred to in the trade as a "ball"). The element 132 comprises a spherical segment which protrudes through a circular opening 133 on the adjacent portion of the reference arm 118. A detector pin 135 is reciprocably mounted in a radial aperture 136 in the contact element 132. In the position shown in FIG. 15, the pin 135 extends beneath the lower spherical surface of the element 132, and the upper end of the pin is disposed in an opening 137 in the cover plate 126.

A detent housing 138 is mounted on the upper surface of the sensing arm 120 around the pin 135. The housing 138 is provided with a spring-loaded detent mechanism 140 which bears against the cylindrical surface of the pin 135. Disposed above the housing 138 in fixed relationship with the pin 135 is a switch actuator 141. The actuator 141 is connected to one of the contact arms 142 of a two-position switch 143. The arm 142 and the remaining contact arm 144 of the switch are suitably mounted on the upper surface of the sensing arm 120.

A transducer 145 is supported on the sensing mechanism 40 within the housing formed by the reference arm plates 123, 124, 125 and 126. The transducer 145 comprises a variable reluctance transformer having a winding assembly 146 which is mounted on the inner plate 124 in fixed relationship with the reference arm 118. The assembly 146 cooperates with a pole piece 147 carried by the facing surface of the pivot plate 128. As the plate 128 pivots about the pin 115 in response to movement of the attached sensing arm 120, in a manner that will become more fully apparent hereinafter, the pole piece 147 is moved relative to the winding assembly 146 to vary the magnetic reluctance therebetween. As will be understood, these variations produce corresponding variations in the electrical output signal from the transducer. The motion of the sensing arm is limited by a suitable stop 148 on the outer plate 125, and a limit switch 149 is carried by one of the plates 123 in position to be actuated by the sensing arm just prior to the movement of the arm into contact with the stop.

The electrical control circuit for the apparatus is shown schematically in FIG. 23. The detected signal from the transducer 145 is applied to the Y axis of a strip chart recorder 150 through a detecting and amplifying circuit 151 and a control circuit 152. The detecting and amplifying circuit 151 includes a bridge network 154, in which the transducer winding 146 comprises one arm of the bridge and a winding (not shown) with identical impedance characteristics is used as a reference arm. The output signal from the bridge 154 is fed to a first amplifier 156, where it is combined with a fixed frequency carrier wave from an oscillator 157. The thus modulated carrier wave is amplified by a second amplifier 158 and a power amplifier 159 and is then directed through a rectifier and demodulator network 160 to the control circuit 152.

In the control circuit 152, the amplified Y-axis signal is received by a divider network 162. The network 162 applies the signal to a Y-span network 163 and then to the recorder 150. The network 163 is effective to set the span or range for the Y axis on the strip chart of the recorder.

The X-axis input to the recorder 150 is received from a potentiometer 165. As best shown in FIG. 3, the potentiometer 165 is supported by the beam 32 and is connected to the chain sprocket 47 by a shaft 166 and suitable reduction gearing 167. This connection is illustrated schematically in FIG. 23 by the dash line 168. The arrangement is such that the input to the X-axis connection of the recorder is directly proportional to the position of the sprocket 47 and hence to the horizontal position of the carriage assembly 38 relative to the paper roll 42. The span for the X-axis on the strip chart is controlled by a network 169, while the location of the zero point on the chart is controlled by a network 169a.

The Y-axis signal from the detecting and amplifying circuit 151 also is applied to two triggering networks 170 and 171 within the control circuit 152. The network 170 controls a relay 172 to apply simultaneous control signals to the recorder 150 and a relay and terminal strip circuit 175. Similarly, the trigger 171 is effective to control a relay 176 to produce an additional control signal leading to the circuit 175.

The clutch 57 and the brake 65 for the vertical drive motor 55 are connected to the relay and terminal strip circuit 175 and are supplied with direct current from a suitable source 180. Also connected to the circuit 175 is a limit switch network 182. This circuit includes a series of limit switches, including the limit switch 83 (FIG. 3), the limit switch 149 (FIG. 18) two further limit switches 183 and 183a (FIGS. 19 and 20). These latter limit switches are respectively mounted on the upper yoke 85 and the sensing mechanism plate 87 and are actuated at predetermined times in a manner that will become more fully apparent hereinafter.

The apparatus is controlled from an operator's station 184 leading to the relay and terminal strip circuit 175. The station 184 contains a push button (not shown) for initiating the operating sequence, an emergency stop button and a pair of indicating lights. Power is supplied to the apparatus through a main disconnect network 185 which is connected to the circuit 175 and is activated by an on/off switch 191. Also connected to the circuit 175 is a winder interlock network 186. This latter network allows the apparatus to operate only when certain winder conditions have been met and prevents use of the winder rolls 44 and 45 (FIG. 1) at any time when the apparatus is in operation. The circuit 175 additionally is provided with a motor overload and switch network 188 for the carriage motor 50 and the vertical drive motor 55, a test switch 189 and a function switch 190. The test switch 189 is used to activate the circuit during testing, while the function switch 190 changes the circuit between a test condition and a normal operating condition.

OPERATION

In the initial, retracted position of the apparatus, the carriage assembly 38 (FIG. 3) is parked at one end of the stationary beam 32 adjacent the potentiometer 165. The sensing mechanism 40 is disposed in a remote location, as shown in FIGS. 4, 12 and 19–21, with the post 73 and the slide rods 76 and 77 in their uppermost positions and with the lower yoke 97 disposed immediately beneath the upper yoke 85. In this position, the mechanism 40 extends in a substantially vertical direction, and the swing pins 127 are held between the cam surfaces 94 and 94A by the camming members 91 and 107, and 92 and 108, respectively, on the upper yoke 85. In addition, the brake 65 is supplied with direct current from the source 180 to maintain the brake in its actuated condition and thereby hold the jack shaft 62 leading to the drive gear 70 stationary. The clutch 57 is in its deenergized and disengaged condition to disconnect the drive motor shaft 56 from the gear 70.

Upon the operation of the start button at the operator's station 184, the carriage motor 50 is energized to advance the carriage assembly 38 along the slide 35 on the beam 32. Once the apparatus is in operation the winder is rendered inoperable by the winder interlock circuit 186. A short distance after the sensing mechanism 40 moves over the adjacent end of the roll 42, the carriage assembly contacts a limit switch (not visible in the drawings) on the beam 32. This switch controls the network 175 to simultaneously (1) disconnect the carriage motor 50, thus bringing the carriage assembly to a stop, (2) release the brake 65 for the bevel gear 70, (3) engage the clutch 57, and (4) initiate operation of the vertical drive motor 55 in a direction to lower the sensing mechanism 40.

The vertical drive motor 55 operates at the higher of its two speeds to rotate the motor shaft 56, the bevel pinions 60 and 61, the jack shafts 62 and 62A, the bevel pinion 67 and the bevel gear 70. As the gear 70 rotates, the threaded post 73 is urged downwardly to similarly move the lower yoke 97, the slide rods 76 and 77 and the sensing mechanism 40 relative to the upper yoke 85. During this downward movement, the swing pins 127 are guided by the cam surfaces 94 and 94A of the camming members 91 and 107, and 92 and 108, respectively, in an outward and downward direction to produce angular movement of the sensing mechanism about the pin 115 from the position shown in FIG. 12 to the position shown in FIG. 13. This angular movement is arrested at the time the sensing mechanism reaches a substantially horizontal position by the upstanding fingers 105 on the brackets 100 and 101. As the sensing mechanism reaches a substantially horizontal position, the limit switch 183a (FIG. 20) is actuated to supply an enabling signal to the triggers 170 and 171 (FIG. 23) and thus condition the triggers for operation. The sensing mechanism is maintained in its substantially horizontal position by the spring-loaded pins 110.

The vertical drive motor 55 continues to lower the sensing mechanism 40 at the higher speed until the detector pin 135 (FIG. 15) carried by the spherical contact element 132 engages the cylindrical surface of the paper roll 42. The roll 42 depresses the pin 135 into the element 132 for a preselected distance, illustratively ⅛ of an inch, at which time the switch actuator 141 moves the switch 143 to its open position. The opening of the switch 143 transfers operation of the drive motor 55 to the lower of its two speeds and activates the brake 65 to apply partial braking and thus retard the downward movement of the sensing mechanism 40. At the time the pin 135 is fully withdrawn within the contact element 132, the spring-loaded detent mechanism 140 moves inwardly to hold the pin in its retracted position.

As the contact element 132 moves into engagement with the surface of the paper roll 42, the sensing arm 120 pivots about the pin 115 relative to the reference arm 118. This pivotal movement carries the transducer pole piece 147 on the arm 120 toward the winding assembly 146 on the arm 118, thus unbalancing the bridge 154 (FIG. 23) and producing an amplified output signal in the circuit 151. This signal is received by the trigger 171, and the trigger is activated to energize the relay 176. Energization of the relay 176 is effective to simultaneously (1) shut off the vertical drive motor 55, (2) disengage the clutch 57 to disconnect bevel gear 70 from the motor drive shaft 56, (3) activate the brake 65 to apply full braking to the bevel gear, and (4) energize the carriage drive motor 50 in the reverse direction. As the bevel gear 70 is braked to a stop, the downward movement of the sensing mechanism 40 is arrested with the sensing arm 120 at the approximate midpoint of its operating range.

As shown in FIGS. 1, 2, 5-8, 12, 13 and 19-21, the movement of the sensing means 40 relative to carriage assembly 38 from its remote, retracted, substantially vertical position to its lower horizontal position in which the contact 132 of the sensing means is positioned in engagement with the surface whose variations are to be measured is produced as follows.

With the above described structure and with the sensing means 40 held in the remote vertical position shown in FIGS. 4 and 8, the enlarged portions 127B of pins 127 are resting on the upper track surfaces 102, 102 of the brackets 100 and 101. As described above, post 73, rods 76 and 77, lower yoke 97, brackets 100 and 101 and track surfaces 102, 102 are in effect a rigid unitary structure. The sensing means 40 is pivoted to 100 and 101 by pin 115. With the sensing means 40 in this remote vertical position the smaller end portions 127A of pins 127 are confined in the tracks formed by the camming surfaces 94 and 94A, these surfaces being formed on camming members 91 and 107 which are rigidly attached to upper yoke 85, which yoke cannot, and does not, participate in the separate vertical movement applied to the lower yoke unit, since 85 is rigidly affixed to carriage assembly 38.

When it is desired to move the sensing means from the remote vertical position to the horizontal position shown in FIGS. 1, 2, 5, 6 and 7 the post 73, rod 76 and 77, lower yoke 97, brackets 100 and 101 and track surfaces 102 and pin 115 move downwardly. The smaller end portions 127A of the pins 127 are prevented from partaking in this initial downward movement by the camming surfaces 94 and 94A. Therefore, pins 127 during this initial downward movement of the lower yoke 97 unit are forced to move initially outwardly along the cam surfaces 94, 94A and, thereafter, are forced to move downwardly and outwardly relative thereto, as shown in FIG. 21. Since the larger portions 127B of pins 127 are resting on the tracks 102, the movement of the lower yoke 97 forces the sensing means 40 to pivot about pin 115 in an outward direction to the position best shown in FIG. 13, with the pins 127 moving initially relative to upper yoke 85 outwardly only and thereafter being forced downwardly and outwardly relative to upper yoke 85 during the end portion of pin travel along the downwardly curved portion of the cam surfaces 94, 94A, as best shown in FIG. 21. Hence, the sensing means 40 is forced to move relative to carriage assembly 38 in an initial angular direction in a vertical plane and is, after pins 127 reach the curved portions of cam surfaces 94 and 94A, caused to move in a simultaneous angular and vertical direction until the pins 127 reach the stop positions at 105, 105, the sensing means then being in the illustrated horizontal position of FIG. 13, not yet in contact with the surface to be scanned.

Thereafter, the horizontally extending sensing means 40 continues its downward movement until the detector 135 contacts the surface to be measured and causes the vertical drive motor 55 to operate at its lower speed. Following this, the contact 132 comes into pivotal engagement with the surface to be measured, and the vertical drive motor 55 is stopped with the sensing means in the position shown in FIGS. 1, 2, 5, 6 and 7.

During the operation of the vertical drive motor 55 to lower the sensing mechanism 40 into contact with the roll 42, the sensing mechanism moves from the position shown in FIG. 4 to the position shown in FIG. 5. As the carriage motor 50 is energized in the reverse direction upon the termination of this downward movement, the carriage assembly 38 and the attached sensing mechanism 40 returns to the left, as viewed in FIG. 5, until the mechanism 40 moves past the end of the roll 42 and reaches the position shown in FIG. 6. At the time the carriage assembly 38 approaches the left extremity of the measuring zone, a limit switch (not visible in the drawings) within the network 182 is actuated to disconnect the motor 50, thus arresting further movement of the carriage assembly and the sensing mechanism.

After a predetermined time delay determined by a suitable dashpot relay (not shown) within the circuit 175, the carriage motor 50 is again energized in the initial direction. Simultaneously, the recorder 150 (FIG. 23) is supplied with an appropriate control signal from the circuit 175 to lower the recording pen into contact with the strip chart. The energization of the carriage motor 50 moves the carriage assembly 38 and the attached sensing mechanism 40 to the right, as viewed in FIGS. 6 and 7, and over the end of the paper roll 42 onto the surface of the roll. The ball-shaped contact element 132 climbs back onto the roll and again pivots the sensing arm 120 in a counterclockwise direction, as viewed in FIG. 15, relative to the reference arm 118, thus producing an output signal in the detecting and amplifying circuit 151. This signal is received by the trigger 170 in the control circuit 152. The trigger 170 actuates the relay 172 to apply a control signal to the recorder 150. The control signal engages the chart advance clutch of the recorder to enable the chart to drive past the recording pen in synchronism with the humps and depressions in the roll surface. The pen moves across the chart in synchronism with the axial position of the sensing mechanism 40 along the axis of the roll 42 as determined by the potentiometer 165 on the return sprocket 47.

The carriage motor 50 drives the carriage assembly 38 and the attached sensing mechanism 40 at a constant speed from one end of the roll 42 to the other in a direction parallel to the horizontal axis of the roll. As the contact element 132 is carried along the cylindrical surface of the roll 42, the element pivots the sensing arm 120 relative to the reference arm 118 in response to variations in the contour or profile of the surface of the roll. In cases in which the contact element 132 rides over a high caliper area on the roll, for example, the sensing arm 120 is moved about the pivot pin 115 in a counterclockwise direction, as viewed in FIG. 15, relative to the reference arm 118 to similarly move the transducer pole piece 147 toward the winding assembly 146. As a result, the bridge network 154 (FIG. 23) produces an output signal of increased magnitude which is amplified by the amplifiers 156, 157 and 158 and is then supplied through the divider network 162 and the Y-span network 163 to the recorder 150. As will be understood, the recording pen provides a visual indication on the strip chart of the high caliper area on the roll. Similarly, in cases in which the contact element 132 passes over a depression in the surface of the roll, the sensing arm 120 pivots clockwise relative to the reference arm 118 to produce a decrease in the magnitude of the output signal and a corresponding visual indication of the depression on the chart.

Representative strip chart traces for successive paper rolls at the discharge end of a papermaking machine are shown in FIG. 22 by the respective curves 195, 196, 197 and 198. These curves are illustrative of the deviation of the surface contour of the rolls from a zero or reference position. The horizontal lines in the Figure are spaced apart by a distance corresponding to a 0.05-inch vertical movement of the contact element 132, while the vertical lines represent the horizontal traverse of the contact element in a direction parallel to the axis of the roll and are spaced apart by a distance corresponding to a 5-inch traverse.

The curves 195, 196, 197 and 198 provide information for the operators of the paper machine with respect to the surface contour of four successive rolls evaluated by the sensing mechanism 40. The curve 195, for example, shows an area 199 of comparatively high caliper in the first of the rolls at a position approximately 25 inches from the end of the roll. Because of the adjustment of the paper machine parameters following the measurement of each roll, the succeeding curves 196, 197 and 198 exhibit progressively lower caliper areas 199', 199'' and 199''' at the 25 inch position of the sensing mechanism. The arrangement is such that the operators of the machine are supplied with a continuous visual record of the position of the sensing arm relative to the reference arm, and hence the surface contour of each successive roll.

The carriage assembly 38 and the attached sensing mechanism 40 continue their horizontal movement across the overhead frame structure provided by the beams 30 and 32. When the carriage assembly 38 reaches the right end of the frame structure, as viewed in FIGS. 2 and 3, the assembly 38 actuates a limit switch (not visible in the drawings) within the network 182 to simultaneously (1) deenergize the carriage motor 50, (2) initiate high-speed reverse operation of the vertical drive motor 55, (3) release the brake 65, and (4) engage the clutch 57. The motor 55 rotates the bevel gear 70, raising the threaded post 73 to return the sensing mechanism 40 to its uppermost position.

During the initial portion of the upward movement of the sensing mechanism 40, the reference arm 118 and the sensing arm 120 remain in their substantially horizontal positions. As the arm brackets 100 and 101 (FIGS. 19–21) approach the upper yoke 85, however, the pins 127 on the side plates 123 contact the camming surfaces 94 on the members 91 and 92. Upon continued upward movement of the sensing mechanism, the members 91 and 92 urge the pins 127 in a relative downward direction to swing the sensing mechanism angularly about the pivot pin 115 from the position shown in FIGS. 7 and 13 to that shown in FIGS. 8 and 12.

Shortly after the sensing mechanism 40 begins to pivot from its horizontal position, a depending finger 202 on the upwardly moving yoke 97 actuates the limit switch 183a (FIG. 20) on the plate 87. The switch 183a deactivates the triggers 170 and 171 (FIG. 23) to maintain the triggers in an inoperable condition until the sensing mechanism is again in position for the measuring operation. As the sensing mechanism approaches its substantially vertical position, the portion of the detector pin 135 which protrudes from the cover plate 126 contacts a flexible reset plate 200. The reset plate 200 is mounted on the upper yoke 85 and is effective to return the pin 135 to its initial position (the position shown in FIG. 15).

As the lower yoke 97 approaches its uppermost position, the yoke actuates the limit switch 183 (FIG. 19) carried by the upper yoke 85. Actuation of the switch 183 is effective to disconnect the vertical drive motor 55 and to also disengage the clutch 57 and activate the brake 65, thus terminating further upward movement of the sensing mechanism 40. Simultaneously, the carriage motor 50 is energized in the reverse direction to drive the carriage assembly 38 across the overhead beam 32 to its fully retracted position. When the assembly 38 reaches this position, the limit switch at the adjacent end of the beam 32 is effective to disconnect the carriage drive motor. The assembly 38 and the attached sensing mechanism 40 are thus disposed in an out-of-the-way location and do not interfere with the further inspection and handling of the paper roll 42.

In cases in which the operating sequence is inadvertently initiated in the absence of a paper roll at the sensing location, or when the roll is of too small a diameter, the sensing mechanism 40 descends in the manner described heretofore until the stop bracket 80 (FIG. 2) on the slide rod 76 engages the limit switch 83. The switch 83 is effective to reverse the vertical drive motor 55 and return the sensing mechanism to its initial position. Should the drive motor 55 continue to lower the sensing mechanism beyond the point at which the contact element 132 engages the roll and moves to its proper operating position, the limit switch 149 (FIG. 18) is actuated to similarly reverse the drive motor. The arrangement is such that the sensing mechanism is automatically returned to its retracted, remote location.

Referring now to FIGS. 24–28, there is shown the recorder 150 with its various components in successive positions during the operating sequence. The recorder includes the usual recording pen 210, the scale 211 and the strip chart 212. In addition, there is provided a chart drive or "Y" motor 215 which is connected through a chart advance or "Y" clutch 216 to a chart drive roller 217. The motor 215 is controlled by the signal from the transducer 145 (FIG. 23) to move the chart forward and backward in response to the humps and depressions in the paper roll. During this movement, the pen 210 is carried across the chart to provide a visual indication of the variations in contour of the roll surface.

At the start of the operating sequence, the chart advance clutch 216 is deenergized and disengaged, and the immediately preceding paper roll profile 220 is visually displayed on the chart a short distance beneath the writing level of the pen 210. The pen 210 is in its raised or "lifted" position at this point in the operation cycle, as shown schematically in FIGS. 24–28 The chart drive motor 215 is electrically connected to the transducer 145, and the "X" or pen drive motor (not shown) is electrically connected to the potentiometer 165 (FIG. 23). The signal to the pen drive motor is short-circuited, however, to maintain the pen drive in an inoperative condition.

As the contact element 132 (FIG. 5) engages the surface of the roll during the lowering of the sensing mechanism 40, the resulting signal from the transducer 145 operates the trigger 171 and the relay 176 to arrest further vertical motion of the sensing mechanism in the manner described above. Simultaneously, the signal from the transducer begins to drive the chart drive motor 215 to a position equivalent to the datum or reference position of the element 132, and the short circuit is removed from the pen drive motor. As the carriage assembly 38 moves to the left from the position shown in FIG. 5, the pen 210 also is carried to the left, as viewed in FIG. 24, by the pen drive motor. During this movement, the chart advance clutch 216 remains in its disengaged condition. During the movement of the carriage assembly 38 to the left from its FIG. 5 position, a timer times out after the chart drive motor 215 has reached a position equivalent to the datum position of the contact element 132 but prior to the time the contact element drops off the adjacent end of the paper roll. The timer is effective to simultaneously engage the chart advance clutch 216 and disconnect the drive motor 215. The arrangement is such that, when the element 132 moves off the end of the roll and reaches the position shown in FIG. 6, the chart drive motor is in its proper datum position and is physically connected to the chart drive roller 217 through the clutch 216.

Figure 25:
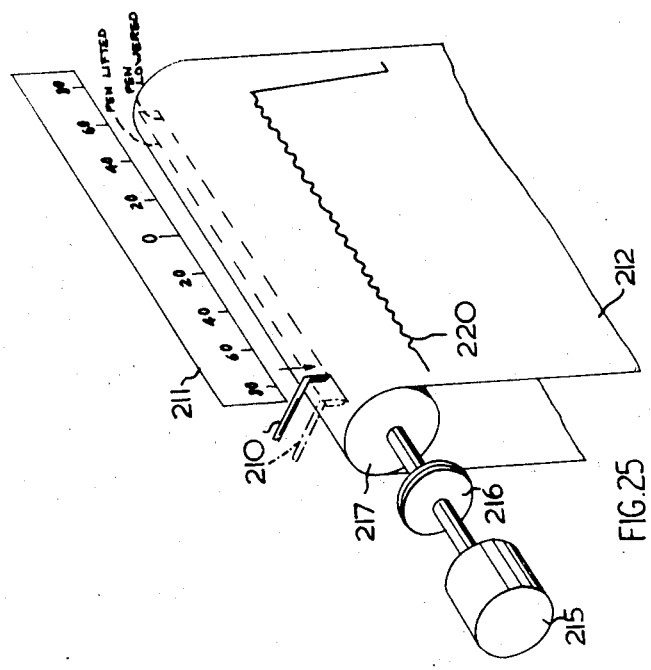
FIGS. 24-28 are schematic perspective views of a portion of the recorder for the apparatus, with certain parts shown in their successive positions during the operating sequence.
Figure 24:
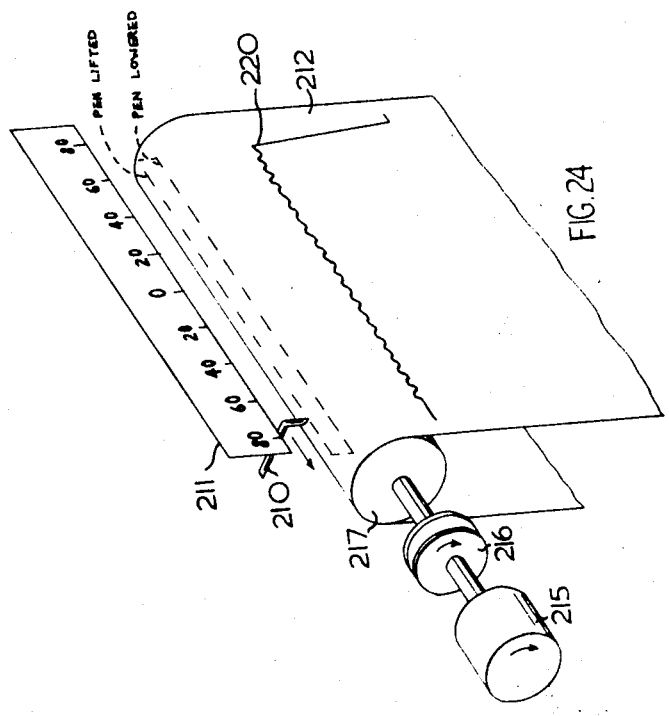

As the contact element 132 reverses direction and moves toward the paper roll, the recording pen 210 is lowered onto the strip chart 212, as shown in FIG. 25. The pen 210 moves to the right in synchronism with the element 132 and writes a short horizontal line on the chart 212. Upon continued movement of the element 132 to the right and back onto the surface of the roll, the resulting signal from the transducer 145 activates the trigger 170 and thus the relay 172 to reconnect the chart drive motor 215. The motor 215 moves backward and forward in synchronous relationship with the humps and depressions on the surface of the roll as the carriage assembly 38 (FIG. 3) traverses the roll. During the movement, the pen 210 produces a profile 222 (FIG. 26) of the roll in precise conformity with the variations in the contour of the surface.

Figure 27:
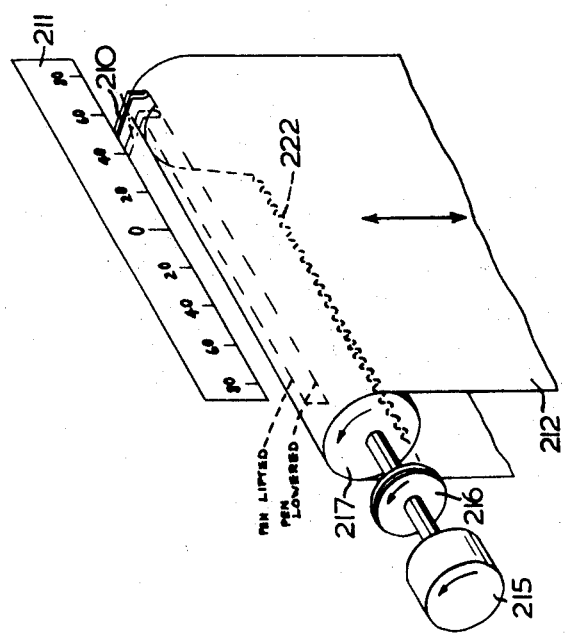
Figure 26:
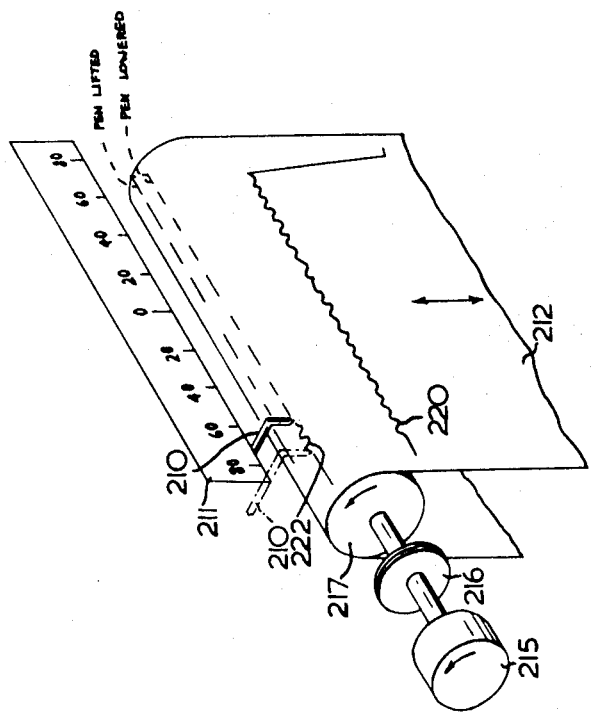
Figure 28:
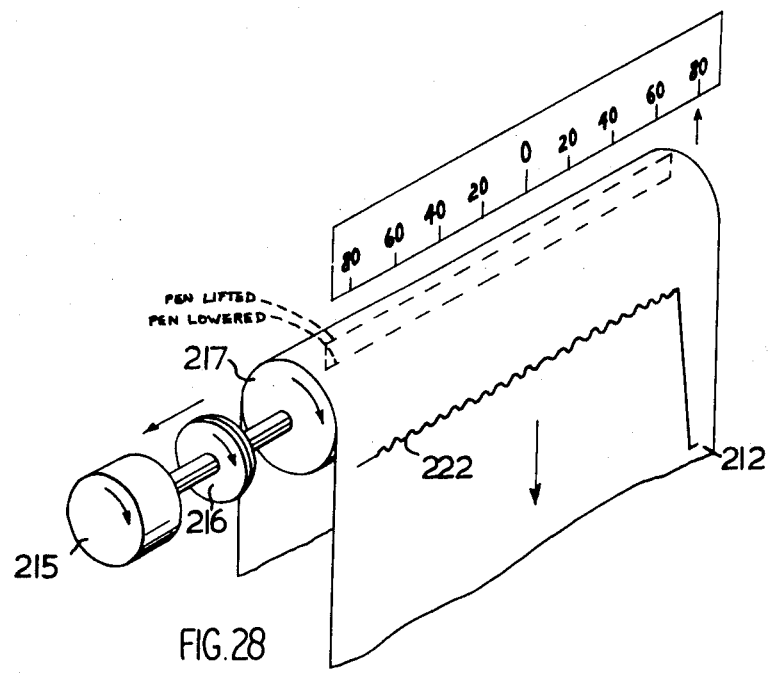

As the contact element 132 moves off the opposite end of the paper roll, the resulting variations in the signal from the transducer 145 causes the chart motor 215 to drive the chart 212 in a backward or reverse direction, as shown in FIG. 27. The chart illustratively moves back about three inches. At the time the carriage assembly 38 reaches the end of its travel and actuates the corresponding limit switch, the pen 210 is raised from the chart, and the signal from the transducer 145 is disconnected from the chart motor 215. Simultaneously, the motor 215 is supplied with a preset signal within the recorder 150 to drive the chart in the forward direction. The chart is advanced by a distance greater than the immediately preceding reverse movement of the chart as the sensing element 40 falls off the end of the roll. The forward movement of the chart illustratively is of the order of about 5 inches. Thus, the profile 220 is immediately visible about two inches below the writing level, and the operator may readily compare the profile 222 with the preceding profile 220 in order to make appropriate adjustments in the machine parameters.

After a short time delay, the chart advance clutch 216 is disengaged, and the preset signal is removed from the drive motor 215 to enable the motor to return to electrical zero without further movement of the chart.

The apparatus and its operating sequence are thus arranged to supply a visual indication of the humps and depressions over the entire length of the paper roll. The recorder 150 provides a continuous visible record of the surface contour from the time the contact element 132 climbs on to one end of the roll to the time the element drops off the opposite end. The successive traces of the recorder are displayed in close proximity with each other on the strip chart, with the result that the traces may be readily compared without the need for moving the chart manually or making other adjustments.

Although the apparatus has been illustrated and described as having particular utility in the measurement of the surface profile of a roll of paper, it also may be employed to detect variations in other types of surfaces of varying geometric configurations. As an illustration, the apparatus is useful in the measurement of surface variations in rolls of fabric or other flexible fibrous materials and in making thickness measurements of generally flat sheet materials. Various other uses for the apparatus will be apparent to those skilled in the art.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for detecting surface variations, comprising, in combination,
    means for supporting a variable surface in a predetermined position,
    a stationary frame mounted with in spaced horizontal relation adjacent said surface supporting means,
    a carriage assembly supported by said frame for movement with respect thereto in a direction parallel to said surface supporting means,
    sensing means including a support member and a contact element movably connected to said support member,
    means for mounting said sensing means on said carriage assembly for relative movement therebetween,
    means for pivotally connecting said sensing means to the mounting means, said sensing means being pivotally movable relative to said surface supporting means in a vertical plane between a retracted position remote from said surface supporting means and an operative position in which said contact element is in contact with said surface,
    means including a transducer carried by said sensing means and producing an output signal in response to movement of said contact element relative to said surface supporting means,
    an indicating mechanism,
    means connecting said transducer output signal to said indicating mechanism,
    control means, and
    operating means controllable by said control means and including first moving means for producing the movement of said sensing means between said retracted position and said operative position and second moving means for producing the movement of said carriage assembly, said first moving means moving said contact element into engagement with said surface and said second moving means moving said carriage assembly and said sensing means in said direction parallel to said surface with said contact element in engagement with said surface, the position of said contact element relative to said surface supporting means being variable in response to variations in the contour of said surface to produce an indication of variations in said surface on said indicating mechanism.

2. Apparatus of the character set forth in claim 1, which further comprises
    feeler means including a detector carried by said contact element and positioned to engage said surface prior to the movement of said contact element into a position wherein said contact element is in contact with said surface, a second transducer, said second transducer being responsive to the movement of said detector, said second transducer generating an output signal upon contact of said detector with said surface, and
    means automatically responsive to the engagement of said detector with said surface for braking the movement of said first moving means.

3. Apparatus for detecting surface variations, comprising, in combination,
    means for supporting a variable surface in a stationary position,
    a stationary frame mounted above said surface supporting means,
    a carriage assembly supported by said frame for horizontal translatory movement with respect thereto,
    sensing means disposed above said surface supporting means and including a support member and a contact element movably connected to said support member,
    means for mounting said sensing means on said carriage assembly for relative vertical movement therebetween,
    means for pivotally connecting said sensing means to said mounting means, said sensing means support member being vertically and pivotally movable relative to said surface supporting means between a retracted position remote from said surface supporting means and an operative position in which said contact element is held substantially solely by gravity in engagement with said surface, means including a transducer carried by said sensing means for producing an output signal in response to movement of said contact element relative to said support member, an indicating mechanism, means connecting said transducer to said indicating mechanism to provide an indication of the position of said contact element relative to said support member, control means, and operating means controlled by said control means and including first moving means for moving said sensing means between said retracted position and said operative position and second moving means for moving said carriage assembly, said first moving means moving said contact element into engagement with said surface and said second moving means moving said carriage assembly and said sensing means in said horizontal direction with said contact element in engagement with said surface, the position of said contact element relative to said surface supporting means varying in response to variations in the contour of said surface to produce an indication of variations in said surface on said indicating mechanism.

4. Apparatus of the character set forth in claim 3, in which said sensing means includes an elongated sensing arm pivotally connected to said support member adjacent one end thereof, said contact element being mounted adjacent the other end of said sensing arm.

5. Apparatus of the character set forth in claim 3, in which said contact element is of semispherical configuration.

6. Apparatus of the character set forth in claim 7, wherein said control means comprises electrical circuit means for automatically controlling said first moving means and said second moving means in a predetermined sequence.

7. Apparatus for detecting surface variations comprising, in combination, means for supporting a variable surface in a predetermined position, a stationary frame mounted in spaced relationship with said surface supporting means, a carriage assembly supported by said frame for translatory movement with respect thereto in a direction parallel to said surface supporting means, sensing means including a support member and an elongated sensing arm pivotally connected to said support member, said support member comprising an elongated housing substantially enclosing said sensing arm but having an opening therein, said sensing arm having a contact element thereon protruding through said opening, means for connecting said sensing means to said carriage assembly for relative movement therebetween, said sensing means being movable relative to said surface supporting means between a retracted position remote from said surface supporting means and an operative position in which said contact element is in engagement with said surface, means including a transducer mounted on said sensing means and producing an output signal proportional to the position of said sensing arm relative to said support member, an indicating mechanism, electrical circuit means connecting said transducer output signal to said indicating mechanism to provide a continuous visual indication representative of the position of said sensing arm relative to said support member, control means, a first drive means controllable by said control means, and a second drive means controllable by said control means, said first drive means moving said sensing means between said retracted position and said operative position and said second drive means moving the carriage assembly, said first drive means carrying said contact element into engagement with said surface, said second drive means thereupon moving said carriage assembly and said sensing means parallel to said surface supporting means with said contact element in engagement with said variable surface, said sensing arm pivoting relative to said support member, whereby to produce in response to variations in the contour of said surface variations in said output signal and thereby produce an indication of said variations on said indicating mechanism.

8. Apparatus for detecting surface variations in a roll of flexible sheet material, said roll having a cylindrical surface, comprising, in combination, means for supporting said roll in an axially stationary position, a stationary frame mounted above said roll supporting means in spaced relationship therewith, a carriage assembly supported by said frame for horizontal translatory movement with respect thereto, sensing means disposed above said roll supporting means and including a support member and an elongated sensing arm pivotally connected to said support member, said sensing arm having a contact element thereon, means connecting said sensing means to said carriage assembly for relative movement therebetween, said sensing means being movable between a retracted position remote from said roll supporting means and an operative position in which the sensing arm extends in a substantially horizontal direction with said contact element held substantially solely by gravity in engagement with the cylindrical surface of said roll, means including a transducer mounted on said sensing means for producing an output signal proportional to the position of said sensing arm relative to said support member, an indicating mechanism, electrical circuit means connecting said transducer to said indicating mechanism to provide a continuous visual indication representative of the position of said sensing arm relative to said sensing means support member, control means, and operating means controlled by said control means and including first drive means moving said sensing means relative to said carriage assembly, said first drive means lowering said sensing means toward said roll supporting means from said retracted position to bring said contact element into operative position adapted for engagement with the surface of said roll, and including second drive means thereupon moving said carriage assembly and said sensing means in said horizontal direction to carry said contact element along the surface of said roll, said sensing arm pivoting relative to said support member, whereby in response to variations in the contour of said surface said output signal is varied and thereby produces an indication of said variations on said indicating mechanism.

9. Apparatus of the character set forth in claim 8, in which said first drive means is supported by said carriage assembly and said second drive means is supported by said frame.

10. Apparatus for detecting surface variations, comprising, in combination, means for supporting the surface in a stationary position, a stationary frame mounted in spaced relationship with said means for supporting said surface, a carriage assembly supported by said frame for horizontal translatory movement with respect thereto in a direction parallel to said surface, sensing means including a support member and an elongated sensing arm movably connected to said support member, said sensing arm having a contact element thereon, means for connecting said sensing means to said carriage assembly for both vertical translatory movement and angular movement of said sensing means with respect to said assembly between a retracted position remote from said surface supporting means and an operative position in which said contact element is in engagement with said surface, means including a transducer mounted on said sensing means for producing an output signal proportional to the position of said sensing arm relative to said support member, an indicating mechanism, electrical circuit means connecting said transducer to said indicating mechanism to provide a continuous visual indication representative of the position of said sensing arm relative to said support member, control means, and operating means controllable by said control means and including first drive means for causing vertical translatory and vertical angular movement of said sensing means with respect to said carriage assembly and second drive means for causing horizontal translatory movement of said carriage assembly, said first drive means moving said sensing means toward said surface from said retracted position and angularly moving said sensing means to said operative position to bring said contact element into engagement with said surface, said second drive means thereupon moving said carriage assembly and said sensing means parallel to said surface with said contact element being positioned for engagement with said surface, whereby said sensing arm moves relative to said support member in response to variations in the contour of said surface to vary said output signal and thereby produce an indication of said variations on said indicating mechanism.

11. Apparatus for detecting surface variations in a horizontally extending roll of flexible sheet material, said roll having a cylindrical surface, comprising, in combination, means for supporting said roll in an axially stationary position, a stationary frame mounted above said roll supporting means in spaced relationship therewith, a carriage assembly supported by said frame for horizontal translatory movement with respect thereto in a direction parallel to the said horizontal axis, sensing means disposed above said roll supporting means and including a support member and an elongated sensing arm pivotally connected to said support member adjacent one end thereof, said sensing arm having a contact element adjacent its other end, means connecting said sensing means to said carriage assembly for simultaneous vertical translatory movement and vertical angular movement of said sensing means with respect to said assembly during a portion of the movement of said sensing means from a remote position to an operative position in which the sensing arm extends in a substantially horizontal direction with said contact element held substantially solely by gravity in engagement with the cylindrical surface of said roll, means including a transducer mounted on said sensing means for producing an output signal proportional to the position of said sensing arm relative to said support member, an indicating mechanism, electrical circuit means connecting said transducer to said indicating mechanism to provide a continuous visual indication representative of the position of said sensing arm relative to said sensing means support member, control means, and operating means controllable by said control means and including first drive means for producing both vertical and angular movement of said sensing means and second drive means for producing horizontal movement of said carriage assembly, said first drive means lowering said sensing means toward said roll from said retracted position and angularly moving said sensing means to said operative position to bring said contact element into engagement with the surface of said roll, said second drive means thereupon moving said carriage assembly and said sensing means in said horizontal direction to carry said contact element along the surface of said roll, said sensing arm pivoting relative to said support member, whereby in response to variations in the contour of said surface said output signal varies and thereby produces an indication of said variations on said indicating mechanism.

12. Apparatus of the character set forth in claim 11, in which said indicating mechanism comprises a strip chart recorder.

13. Apparatus of the character set forth in claim 11, in which said operating means includes automatic means for predetermining the sequence of operation of said first and second drive means.

14. Apparatus of the character set forth in claim 13, in which said automatic means controls said first and second drive means to move said contact element into said operative position for engagement with said roll, then move said carriage assembly in a direction to carry said contact element to a position off one end of the roll, and then reverse said carriage assembly to bring said contact element back into an operative position for engagement with said roll.

15. Apparatus of the character set forth in claim 11, which said sensing means support member comprises an elongated housing substantially enclosing said sensing arm.

16. Apparatus for detecting surface variations in a horizontally extending roll of flexible sheet material having a cylindrical surface, comprising, in combination, means for supporting said roll in an axially stationary position, a stationary frame mounted above said roll supporting means in spaced relationship therewith, a carriage assembly supported by said frame for horizontal translatory movement with respect thereto, sensing means disposed above said roll support means and including a support member and an elongated sensing arm pivotally connected to said sensing means support member adjacent one end thereof, said sensing arm having a contact element adjacent its other end, means for connecting said sensing means to said carriage assembly for both vertical translatory movement and angular movement of said sensing means in a vertical plane with respect to said assembly, said sensing means being movable between a retracted position remote from said roll support means and an operative position in which the sensing arm extends in a substantially horizontal direction with said contact element held by gravity in engagement with the cylindrical surface of said roll, means including a transducer mounted on said sensing means and producing an output signal proportional to the position of said sensing arm relative to said roll supporting means, an indicating mechanism, electrical circuit means connecting said transducer output signal to said indicating mechanism to provide a continuous visual indication representative of the position of said sensing arm relative to said roll supporting means, control means, and operating means controlled by said control means and including first drive means supported by said carriage assembly for producing vertical and angular movement of said sensing means in a vertical plane and second drive means carried by said frame for controlling the horizontal movement of said carriage assembly, said first drive means lowering said sensing means toward said roll support means from said retracted position and angularly moving said sensing means to said operative position to bring said contact element into position for engagement with the surface of said roll, said second drive means thereupon moving said carriage assembly and said sensing means in said horizontal direction to carry said contact element along the surface of said roll, movement of said contact element pivoting said sensing arm relative to said support member in response to variations in the contour of said surface to vary said output signal and thereby produce an indication of said variations on said indicating mechanism, feeler means including a detector carried by said contact element and positioned to engage said surface prior to the movement of said contact element into contact therewith, a second transducer, said second transducer being responsive to the movement of said detector, said second transducer generating an output signal upon contact of said detector with said surface, and means automatically responsive to the engagement of said detector with said roll surface for braking the downward movement of said sensing means.

17. Apparatus of the character set forth in claim 16, further comprising means for maintaining said detector in protruding relationship with said contact element prior to the time the contact element engages said roll.

18. Apparatus of the character set forth in claim 16, in which the means for connecting said sensing means to said carriage assembly includes a plurality of cam tracks for controlling the angular movement therebetween.

19. Apparatus for detecting surface variations, comprising, in combination, means for supporting the surface in a predetermined location, a first drive means, control means for said first and said second drive means, a carriage assembly positioned in spaced relationship with said surface supporting means for movement in a direction parallel thereto, sensing means initially supported in a position remote from said surface supporting means and including a support member and a sensing member pivotally connected to said support member, a contact element carried by said sensing member, means interconnecting said sensing means and said carriage assembly for angular movement of said support member and said sensing member as a unit toward and away from said surface supporting means, said first drive means operable by said control means and moving said sensing means in a vertical plane in an angular direction relative to said mounting means to carry said contact element from said remote position to an operative position in engagement with the surface, said second drive means operable by said control means after said engagement of said contact element with the surface and advancing said carriage assembly in a direction parallel to said surface supporting means to slide said contact element along said surface, said sensing member pivoting relative to said surface support means in response to variations in the contour of said surface, and means responsive to the pivotal movement between said sensing member and said surface supporting means for providing an indication of variations in said contour.

20. Apparatus for detecting surface variations, comprising, in combination, means for supporting the surface in a predetermined location, a first drive means, a second drive means, control means for both said first and said second drive means, a carriage assembly positioned in spaced relationship with said surface for movement in a direction parallel thereto, mounting means supported by said carriage assembly for linear movement toward and away from said surface supporting means and located initially in a position remote from said surface supporting means, sensing means including a support member and a sensing member pivotally connected to said support member, a contact element carried by said sensing member, means interconnecting said sensing means and said mounting means for angular movement of said support member and said sensing member as a unit toward and away from said surface supporting means, said first drive means controllable by said control means and moving said mounting means in a linear direction toward said surface supporting means and automatically moving said sensing means in a vertical plane in an angular direction relative to said mounting means in response to said linear movement, said linear and angular movement carrying said contact element from said promote position to an operative position in engagement with said surface, said second drive means controllable by said control means and advancing said carriage assembly in a direction parallel to said surface supporting member to slide said contact element along said surface, said sensing member pivoting relative to said support member in response to variations in the contour of said surface, and means responsive to the pivotal movement between said sensing member and said support member for providing an indication of variations in said contour.

21. Apparatus for detecting surface variations, comprising, in combination, means for supporting a variable surface in a predetermined location, a first drive means, a second drive means, control means for both said first and said second drive means, a carriage assembly positioned in spaced relationship with said surface for movement in a direction parallel thereto, mounting means supported by said carriage assembly for linear movement toward and away from said surface supporting means and located initially in a position remote from said surface supporting means, sensing means including a support member and a sensing member pivotally connected to said support member, said support member comprising a housing substantially enclosing said sensing member but having an opening therein, a contact element carried by said sensing member and protruding through the opening in said housing, means interconnecting said sensing means and said mounting means for angular movement of said support member and said sensing member as a unit in a vertical plane toward and away from said surface, the interconnecting means including a movable pivot for said sensing means, cam means for moving said pivot, said first drive means moving said mounting means in a linear direction toward said surface supporting means and automatically moving said sensing means about said movable pivot in a vertical plane in an angular direction relative to said mounting means in response to said linear movement, said linear and angular movement carrying said contact element from said remote position to an operative position in engagement with said surface, said second drive means advancing said carriage assembly in a direction parallel to said surface supporting means to slide said contact element along said surface, said sensing member pivoting relative to said surface supporting means in response to variations in the contour of said surface, and means responsive to the pivotal movement between said sensing member and said surface supporting means for providing an indication of variations in said contour.

* * * * *